G. GAWLET.
LOADING AND UNLOADING MACHINE.
APPLICATION FILED OCT. 29, 1917.

1,272,655.

Patented July 16, 1918.
2 SHEETS—SHEET 1.

INVENTOR:
GREGORY GAWLET
BY Hazard and Miller
ATTORNEYS

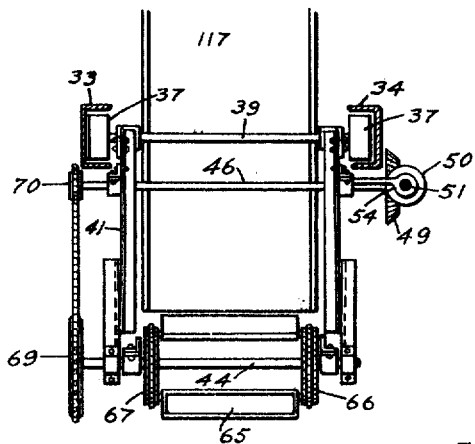
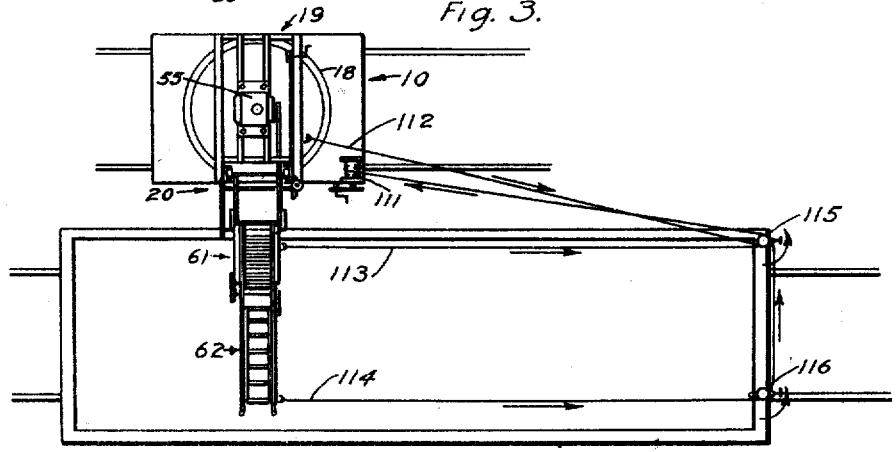

UNITED STATES PATENT OFFICE.

GREGORY GAWLET, OF LOS ANGELES, CALIFORNIA.

LOADING AND UNLOADING MACHINE.

1,272,655.   Specification of Letters Patent.   Patented July 16, 1918.

Application filed October 29, 1917. Serial No. 199,054.

*To all whom it may concern:*

Be it known that I, GREGORY GAWLET, a subject of the Emperor of Germany, residing at Los Angeles, in the county of Los Angeles and State of California, have invented new and useful Improvements in Loading and Unloading Machines, of which the following is a specification.

This invention relates to conveyer mechanism and particularly pertains to a loading and unloading machine especially adapted for use in carrying loose material from freight cars and the like.

It is the principal object of this invention to provide a portable conveying mechanism which may be adjustably positioned within a freight car or other vehicle bodies and will gather and elevate material therefrom and transfer it to a point alongside the car.

Another object of this invention is to provide means whereby the conveying mechanism may be allowed to swing horizontally and vertically and to be positively moved the length of the car as the unloading operation proceeds.

Another object of this invention is to provide a conveying mechanism which may be readily folded and placed compactly in an inoperative position for transfer from one location to another.

Other objects will appear hereinafter.

The invention is illustrated, by way of example, in the accompanying drawings in which:

Fig. 2 is a view in transverse section as seen on the line 2—2 of Fig. 1 and particularly discloses the mast construction.

Fig. 3 is a view in plan illustrating the manner in which the unloading mechanism is disposed alongside the car and particularly discloses the manner in which the entire mechanism is advanced as the unloading operation proceeds.

Figure 1:
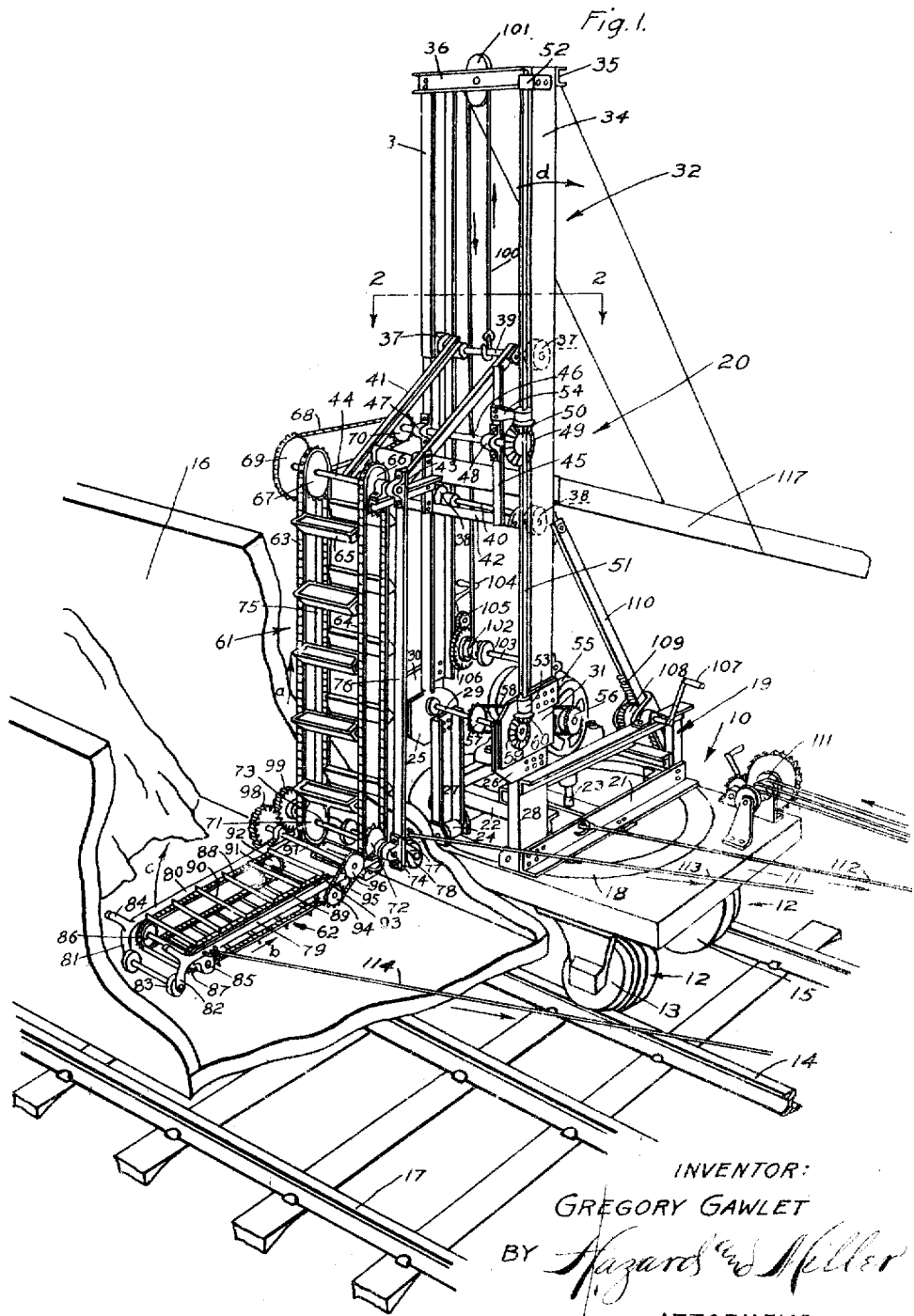
Figure 1 is a view in perspective illustrating the conveying mechanism as disposed in operative position in relation to a freight car of the gondola type which is here shown in a fragmentary manner.

Referring more particularly to the drawings, 10 indicates a truck comprising a flat horizontal bed portion 11 and a running gear consisting of wheels 12. These wheels are of differential diameter, and have flanged portions 13 for use when the truck is to be run on a track 14, and have enlarged wheel portions 15 for use when the truck is to be moved along the ground. When the truck is used in its present embodiment, it is disposed alongside a freight car 16 which is on a track 17 parallel to the track 14.

A turn-table 18 is mounted upon the bed 11 of the truck and is adapted to support the sub-frame 19 of the conveying mechanism 20 with which the present invention is particularly concerned. This sub-frame is composed of a pair of side bars 21 which are connected by transverse frame members 22 to form a rigid structure which is mounted upon a turn-pin 23 around which the turn-table 18 is concentrically arranged. Rollers 24 are rotatably secured to the sub-frame and allow it to be easily moved along the turn-table. Bearing plates 25 and 26 are secured to the posts 27 and 28 of the sub-frame and provide suitable mountings for a jack-shaft 29 by which the conveying mechanism is driven in a manner which will be hereinafter set forth. Pivot plates 30 and 31 are rotatably mounted upon the jack-shaft 29 to support a mast 32. This mast consists of a pair of spaced guide channels 33 and 34 which are secured in fixed relation to each other at their upper ends by transverse frame members 35 and 36. The grooves of the channels extend inwardly to provide a guide-way.

The guide-way formed by the channels 33 and 34 is designed to receive guide rollers 37 and 38 which are positioned at opposite ends of frame shafts 39 and 40 composing a part of the conveyer carriage. This carriage is completed by obliquely inclined extension bars 41 and 42 which extend outwardly and are fitted with bearings 43 through which an elevator shaft 44 is rotatably mounted. Vertical frame members 45 connect the oblique members 41 and 42 and provide a support for the carriage shaft 46. This shaft is rotatably mounted within bearings 47 and 48 upon the members 45 and is fitted with a bevel gear 49 adapted to constantly mesh with a bevel pinion 50. This pinion is splined to a vertical drive shaft 51 having its bearings 52 and 53 secured to the side of the mast 32 to hold it in parallel relation to the mast. A slide bracket 54 engages the pinion 50 to cause it to slide along the shaft as the carriage frame moves.

The shaft 51 is driven from a motor 55 mounted upon the sub-frame of the machine and in connection with the jack-shaft 29 by sprocket wheels 56 and 57 and a sprocket chain 58. The jack-shaft is provided with a bevel driving gear 59 in mesh with a driving pinion 60 fixed to the lower end of the shaft 51 and by which it is directly driven.

The rotary motion produced by the motor 55 is provided to drive an elevating mechanism 61 and a conveying mechanism 62 at the lower end thereof. The elevating mechanism comprises a set of conveyer chains 63 and 64 between which elevating buckets 65 are disposed. These chains pass over sprockets 66 and 67 secured upon the shaft 44, which, as previously described, is held for rotation at the outer end of the carriage. This shaft is driven by a sprocket chain 68 which passes around a sprocket 69 secured to the end of the shaft 44 and a sprocket 70 secured to the end of the carriage shaft 46. The conveyer chains 63 and 64 pass around sprockets 71 and 72 at their lowermost points of travel. These sprockets are fixed to a shaft 73 rotatably held within bearings 74 at the lower end of distance rods 75 and 76 which are pivotally mounted at their upper ends upon the shaft 44. Spacing arms 77 are provided at the lower ends of the distance rods to hold the elevating mechanism from contact with the side of the car body, and are fitted at their outer ends with rollers 78.

In order that the material to be elevated may be reached by the elevating mechanism, the conveying mechanism 62 is pivotally disposed at the lower end of the elevating mechanism to extend across the car. This mechanism consists of a pair of radius rods 79 and 80 which are pivotally mounted by bearings around the shaft 73 and are supported at their outer ends by downturned arms 81 and 82 between which roller wheels 83 are rotatably secured. Handles 84 are also provided to allow the radius rods to be swung vertically. Mounted at the outer ends of the radius rods is a conveyer shaft 85 upon which sprockets 86 and 87 are mounted. These sprockets are in mesh with sprocket chains 88 and 89 upon which raking bars 90 are mounted. A shaft 91 is rotatably secured at the inner ends of the radius rods to support sprockets 92 and 93 around which the chains 88 and 89 pass. This shaft is driven by a sprocket wheel 94 secured at one end of the shaft and in mesh with a sprocket chain 95 passing around a driving sprocket 96. This last-named sprocket is secured at the end of an auxiliary shaft 97 rotatably mounted on the upper side of the radius rods and provided with a gear 98 in mesh with a similar gear 99 which is fixed on the end of the shaft 73. Due to this construction the conveyer mechanism may have radial movement in relation to the elevating mechanism with-out interruption of a delivery of power thereto.

The elevating and conveying mechanisms may be simultaneously adjusted throughout a vertical plane by means of the cable 100 which passes over a sheave 101 rotatably disposed at the upper end of the mast 32. This cable is then led downwardly around a drum 102 mounted upon a shaft 103 rotatably disposed across the lower end of the mast and adapted to be operated by a crank 104 through gears 105 and 106.

The mast may be adjustably tilted by means of crank arm 107 disposed upon the sub-frame and fitted with a pinion 108 in mesh with a rack 109. The rack is secured along the under race of an adjusting leg 110 which is pivotally connected at its upper end to the mast.

In order that the entire elevating and conveying mechanism may be moved along the car as the unloading proceeds, a windlass 111 is provided around which cables 112, 113 and 114 may be wound. These cables are led around pulleys 115 and 116 detachably secured at the forward end of the car. The cables are then brought back and secured to suitable hooks along the frame of the conveyer mechanism and the truck.

In operation, the apparatus may be set up as shown in Fig. 1. This is accomplished by swinging the sub-frame of the mast upon its turn-table until the conveying and elevating mechanisms are in proper relation to the car. The mast may then be swung vertically and adjustably set by the crank arm 107 and the gearing connected therewith. The carriage of the apparatus may then be adjusted vertically along the mast by winding or unwinding the cable 100 by the mechanism previously described. When so adjusted, the apparatus is ready for operation which is accomplished through power delivered from the motor 55. The rotation of the motor is imparted to the shaft 29 and thence by means of intervening gears 59 and 60 to the splined shaft 51. This shaft in turn drives carriage shaft 46 by means of gears 49 and 50, after which the rotation of the shaft 46 will drive the shaft 47 and advance the elevating mechanism in the direction of the arrow —a—. The chains 63 and 64 of this mechanism will transmit power to the shaft 97 which will be delivered to the chains of the conveyer mechanism, which will be driven toward the elevating mechanism in the direction of the arrow —b—. The material collected by the mechanism will be fed into a chute 117. It is believed that the operation will otherwise be evident.

When the use of the apparatus is not desired it may be folded up and carried away. This is accomplished by swinging the conveying mechanism and its radius arms upwardly in the direction of the arrow —c—, after which the carriage and elevating mechanism may be drawn upwardly along the mast and swung downwardly in the direction of the arrow —d—. In this manner the entire mechanism will be collapsed over the sub-frame. The truck may then be drawn along the track upon its wheel portions 13 or run off onto the ground upon its wheel portions 15.

It will be understood that the adjustable construction of the device and its pivotal mounting makes it possible to use the machine for elevating material from the ground and delivering it to a vehicle. The scope of operating being throughout a wide radius of travel, the conveyer construction makes the device especially valuable in unloading box cars through the door of which the conveyer may be extended.

It will thus be seen that the device here disclosed may be easily handled and carried from place to place, after which it may be readily set up for operation and due to its flexibility of drive and adjustments will adapt itself to collect and elevate material in a thorough manner.

While I have shown the preferred construction of my loading and unloading machine as now known to me, it will be understood that various changes in the combination, construction and arrangement of parts may be made by those skilled in the art without departing from the spirit of my invention as claimed.

I claim:

1. A loading and unloading machine comprising a truck, a turn-table formed upon said truck, a mast extending upwardly from said turn-table and pivoted for swinging movement therefrom, an adjustable mechanism for regulating the angular disposition of the mast, a conveyer carriage mounted upon the mast, means for adjustably disposing the conveyer carriage at points along the mast, a vertically extending elevating mechanism pivotally secured to the carriage, a substantially horizontally extending conveying mechanism pivoted to the lower end of the elevating mechanism, driving means, and means whereby said conveying and elevating mechanisms may be continuously driven irrespective of their angular relation to each other and the carriage and irrespective of the adjusted position of the carriage upon the mast and the angular disposition of the mast.

2. A loading and unloading machine comprising a truck, a turn-table upon the truck, a mast extending upwardly from the turn-table, a conveyer carriage slidingly connected to the mast, means for adjusting the conveyer carriage up and down on the mast, a vertically extending elevating mechanism pivotally secured to the carriage; said carriage serving to space the elevating mechanism from the mast so that the truck may be on one track and the elevating mechanism may extend over and down into a car upon another track; a horizontally extending conveying mechanism connected to the lower end of the elevating mechanism and adapted to rest upon the bottom of the car, and means for simultaneously advancing the truck, the vertical elevator, and the horizontal conveyer.

In testimony whereof I have signed my name to this specification.

GREGORY GAWLET.